Figure 1:
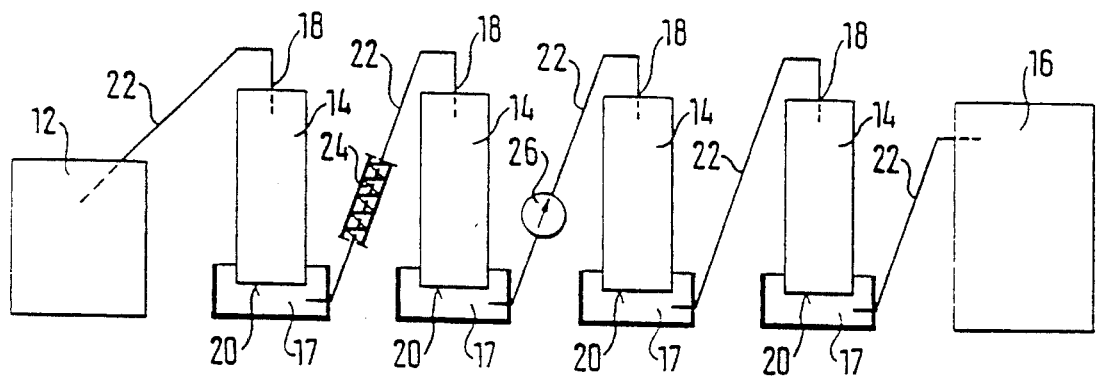

United States Patent [19]
Lindner

[11] Patent Number: 5,498,431
[45] Date of Patent: Mar. 12, 1996

[54] DECONTAMINATION AND DETOXIFICATION OF CEREALS CONTAMINATED WITH MYCOTOXINS

[76] Inventor: Wolfgang Lindner, St. Veiter-Anger 22, Graz, Austria, 8046

[21] Appl. No.: 119,086

[22] PCT Filed: Mar. 17, 1992

[86] PCT No.: PCT/EP92/00579

§ 371 Date: Sep. 16, 1993

§ 102(e) Date: Sep. 16, 1993

[87] PCT Pub. No.: WO92/16116

PCT Pub. Date: Oct. 1, 1992

[30] Foreign Application Priority Data

Mar. 18, 1991 [DE] Germany ............ 41 08 746.1

[51] Int. Cl.⁶ ................ A23B 9/00; A23L 3/00
[52] U.S. Cl. ............ 426/238; 99/451; 422/20; 426/506
[58] Field of Search ................ 426/238, 506, 426/241; 99/451; 422/20

[56] References Cited

U.S. PATENT DOCUMENTS 4,477,357  10/1993  Sittenfeld ................ 210/748

FOREIGN PATENT DOCUMENTS

| 387693 | 2/1989 | Austria . | |
| 58109 | 9/1953 | France | 426/238 |
| 1914095 | 10/1970 | Germany . | |
| 4019996A1 | 10/1991 | Germany . | |
| 2-163052 | 6/1990 | Japan | 426/241 |
| 7003978 | 9/1970 | Netherlands | 426/238 |
| 1554040 | 10/1979 | United Kingdom . | |

Primary Examiner—George Yeung
Attorney, Agent, or Firm—Townsend and Townsend and Crew

[57] ABSTRACT

A process and device are disclosed for detoxicating and decontaminating produce, in particular cereals and other seeds used as foodstuffs and/or fodder. The produce or cereals are subjected to an ultrasonic treatment in an aqueous medium. It has been discovered that such a treatment surprisingly causes effective decontamination or detoxication of the contaminated produce, without affecting the appearance, taste, nutritive value of the decontaminated produce, above all cereal produce.

53 Claims, 3 Drawing Sheets

FIG. 4.

naturally contaminated maize each spiked with 500ng trichothecene toxin content in maize / in maize after detox / in solution after detox DON, 3-Acetyl-DON, Triol, DAS, HT-2, T-2

DECONTAMINATION AND DETOXIFICATION OF CEREALS CONTAMINATED WITH MYCOTOXINS

BACKGROUND OF THE INVENTION

The present invention relates to a method for the decontamination and detoxification of substances, in particular of seeds such as rice, buckwheat, legumes, nuts or the like, and of cereals, in particular maize, wheat, oats, barley, rye which are contaminated with mycotoxins, such as for example aflatoxins, zearalenones or ochratoxins, in particular with tetracyclic trichothecene mycotoxins of the general basic formula

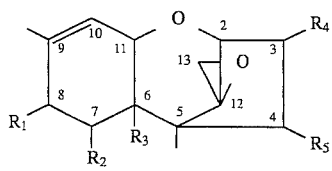

with the radicals $R_1$ to $R_5$ being described by the various trichothecene mycotoxins, such as for example T-2 toxin (T-2), HT-2 toxin (HT-2), diacetoxyscirpenol (DAS), monoacetoxyscirpenol, neosolaniol, nivalenol (NIV), deoxynivalenol (DON), 3-acetyldeoxynivalenol (3-AcDON), T-2 tetraol, scirpentriol, fusarenon, crotocin, satratoxin H etc.

Aflatoxins, zearalenones and ochratoxins have quite different chemical structures when compared with the trichothecenes, but have in common with them an ester or lacton structure element in the molecule which is reactive and which can for example react with compounds with a primary or secondary amino function to form the corresponding amides.

Trichothecenes are sesquiterpenoid compounds with a C12, C13 spiroepoxy group which are produced by fungi such as fusarium, trichothecium, myrothecium, stachybotrys and other. Rice and different cereal types, in particular maize, wheat, oats, barley and rye, are contaminated depending on the kind of species, climatic conditions and nature of the ground by these fungi and are in this way contaminated with secondary metabolic products, with the mycotoxins, such as the trichothecene type. These mycotoxins cause various trichothecene toxicoses, both in animals when the contaminated cereal is used as feed and also in humans.

The various trichothecenes act in different concentrations in such a way that they cause cell damage, are neurotoxic and dermatoxic and lead to a rejection of the feed, to sickness and diarrhea. Over a longer period of time relatively large quantities of mycotoxins can be passed on, especially to animals, via the feed or feed cereals and even by those having a small mycotoxin contamination and this often leads to serious disorders (see "Mycotoxins in Food", P. Krogh, Edt., Academic Press, New York, 1987). The fungi which deliver the trichothecenes generally already contaminate the cereal in the field and can however also remain active with incorrect storage of the cereal (for example cool and moist). One can perhaps control the storage conditions but not however the contamination in the field so that this also depends strongly on climatic conditions.

A harvest which is strongly contaminated with mycotoxins is hardly usable and leads to substantial economic damage. In particular this also applies to maize and wheat which are used in large quantities in the feed industry. As investigations show (Hart and Braselton, J. Agric. Food Chem. 31, 657 (1983)) the dry milling process of wheat which was for example contaminated with DON admittedly leads to a partial separation of DON richer and DON weaker flour and meal, however in any event DON remains in the end product. The same also applies to maize products.

Trichothecenes are chemically relatively stable, in particular the toxophor group, the 12,13 epoxide. Thus the deoxynivalenol (DON) is hardly broken down even with cooking, roasting and baking conditions and also during autoclaving or steam treatment (toasting, pelleting, extruding) and thus also remains in existence in a prepared feed or foodstuff. That is to say, no detoxification is achieved in this way (see A.El-Banna et al., J. of Food Protection 46 (6) (1983)). Trichothecenes which contain an ester group are converted in the alkaline mixture into the corresponding alcohols, however the toxicity of the decomposition products obtained in this way is mainly high and is generally hardly reduced via this decomposition route (see "Mycotoxins in Food" and citations therein).

Since it is only in the last few years that it has been fully recognized that especially DON and also 3-AcDON occur in previously unknown high concentrations on maize and other cereals, increased importance is placed on investigation of the products with regard to the DON content and the legislatory authorities in the various countries are beginning to react to this. There are however as yet no binding regulations on upper limits for the content of trichothecene mycotoxins. However, on the basis of toxicological data (see "Mycotoxins in Food", chapter 6 "Thrichothecenes in Food") it is recommended that for example the values of 2 ppm (1 ppm) for DON and 0.2 ppm for nivalenol should not be exceeded. Since small children and children react considerably more sensitively to mycotoxins, the limit for children's food should be set substantially lower. The same applies for animal feeds which are used with young animals, and in this case attention should also be paid to the consumption of animal feed over a long period of time. The extent to which the trichothecenes experience an increase in activity through other micotoxins, or vice versa, is still largely unclear, however one is aware of a possibly enhanced health risk.

For the above named reasons, increased importance is attached to the development of methods for reducing the mycotoxin content of the cereals and, as a consequence, of cereal products.

As a result of the high toxicity of mycotoxins of the aflatoxin type, which represent metabolic products of storage fungi (for example aspergillus types), the development of methods for the decontamination of products containing aflatoxins, such as for example peanut meal, maize and other cereals, stands in the foreground. Based on the chemical structure of aflatoxins (contained in one lacton ring) processes which concern the treatment of the material with an amine (for example ammonia or monomethyl amine) in a strongly alkaline medium (for example with Ca(OH)2 or NaOH) at an elevated temperature (for example 100° C.) and under pressure (for example 3 to 10 bar) for half an hour to several hours have shown themselves to give the desired end result (see I. Apelt, Die Mühle+ Mischfuttertechnik, year 126, No. 30, 435 (1989)). This strongly alkaline treatment of the cereal or of the nut meal with an amine additive (ammonia or methylamine) and with a possible further assistance of formaldehyde (method currently in use in France) is hitherto the only relatively certain and practicable way of detoxification of aflatoxins, zearalenones and ochratoxins.

As treatisees describe, the detoxification of fusarium toxins such as T-2 toxin, diacetoxyscripenol and zearalenone can also be achieved under these conditions (see J. Bauer et al., Tierärztl. Umschau 42, 70–77 (1987)). In the context of a symposium "undesired substances in foodstuffs, mycotoxins in cereals and animal feeds—methods for their removal" held in Braunschweig 30./31.10.1990 (see IFF/Informationsdienst No. 224/1990) it was reported that in addition to the fusarium toxin deoxynivalenol (DON) also zearalenone, ochratoxin and aflatoxin could be largely removed by the alkali/amine treatment of cereals under pressure and at 95° C.

From the existing prior art it can be seen that a detoxification of the mycotoxins such as aflatoxin B1, T-2 toxin, diacetoxyscirpenol, deoxynivalenol and zearalenone (a likewise relatively frequently encountered mycotoxin on cereals) and also ochratoxin (a mycotoxin produced by storage fungi) can, as examinations of the materials show, largely be achieved after the physical-chemical and also biological processes. The treatment conditions (strongly alkaline, addition of amines, optionally addition of formaldehyde, high temperature T>90° C. and pressure) are however to be regarded as drastic from a chemical viewpoint. The quality evaluation of cereal and feed samples treated in this way was not described, however from our own experience, a partial change of the color, taste and quality of the products certainly takes place.

In DE 40 19 996 A1 there is described a method of cleaning fruits and vegetables from contaminants such as mud, biological contamination, microbiological flora, such as mold fungi, fungi, worms, bacteria, microbes and also chemicals such as pesticides, fertilizer residues and the like from the rough or smooth surfaces of fruits and vegetables of all kinds. In this method the fruits to be cleaned are introduced into a tank filled with water and are subjected to an ultrasonic oscillation field. During this a mixture of cleaning, floatation and disinfection agents can be added to the water.

This known method serves to free fruits and vegetables which are to be processed in the kitchen from the customary contamination and is intended to replace the washing off which is normally done by hand or by means of hydromechanical cleaning devices.

The decontamination and detoxification of cereals or other seeds intended as foodstuffs are however not addressed. In particular a reference can be found in the method described in DE 40 19 996 A1 as to how toxic metabolic products of mold fungi, in particular of mycotoxins, can be decontaminated and/or removed from fruits and vegetables. Moreover, the treatment of cereals and other seeds serving as foodstuffs is not explained.

In DE 19 14 095 A1 there is further described a method for decontamination of oil-containing or fat-containing foods, such as for example nut kernels or cereals or cereal products containing aflatoxins. In this process the material containing the poison is washed or sprayed with warm water or water vapor and is subsequently rinsed with water at room temperature or below. The washing and rinsing takes place on a vibrating channel on a vibrating sieve, with the material to be treated being subjected during the washing process to ultrasonic action in order to keep the material being treated vibrating and thus to improve the washing action.

The method known from DE 19 14 095 thus likewise only describes the washing of the material to be treated and in particular does not describe the detoxification for which a decomposition of the mycotoxins is necessary.

SUMMARY OF THE INVENTION

An object of the present invention provides a method for the detoxification of mycotoxins under gentle conditions, with the decontaminated cereal products or treated products remaining largely unchanged with respect to their appearance, flavor and nutritious value.

Surprisingly it has now been found that one can achieve an extensive detoxification of mycotoxins by the ultrasonic treatment of the seeds and cereal grains such as rice, maize, wheat, barley, oats, rye, nuts and however also meal and farine of the same in an aqueous medium, in particular of trichothecen mycotoxins of the general formula I

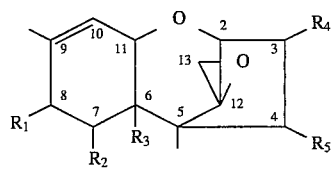

in which $R_1$ to $R_5$ are defined as above, depending on the substituents which are to be specified for the particular toxin. Pointers exist, that the method also has general validity for the decontamination and/or detoxification of the various substances. Furthermore, findings exist which show that the method can also be used for the decontamination and/or detoxification of fusarium mycotoxins of the zearalenone series and of the ochratoxin series and also of aspergillus mycotoxins of the aflatoxin series.

The method of the invention relates to the time pulsed or unpulsed ultrasonic treatment for 10 sec. to 200 min. duration of the seeds or cereal grains or meal which are present in an aqueous suspension at a temperature range between 12° to 50° C., with an alcohol such as for example methanol, ethanol, glycerine or polyethylene glycol being optionally added to the water as a wetting and/or reaction partner and reaction accelerator. The addition of small quantities of alkali, such as for example $Ca(OH)_2$ or $NaHCO_3$ or $Na_2CO_3$ between 0.2 and 2% or of ammonia or methylamine between 0.1 and 0.5%, or of acids (for example dilute hydrochloric acid, sulphuric acid, phosphoric acid, acetic acid or priopionic acid) is advantageous in some cases.

Microcavitation or cavitation bubbles arise in the ultrasonic bath, that is to say in the aqueous solution, as a result of the ultrasonic waves which are introduced there. These are regions in which so to say solvent-implosions arise which are accompanied by local pressure waves (up to 100 kPa), the occurrence of temperatures of up to 1700° C. also being temporarily possible in the microcavitation cells. The entire solvent bath heats up in the course of the ultrasonic treatment, but to temperatures above 70° C. only after a long period of irradiation.

Two different processes are now triggered by the physical phenomenon of the microcavitation bubbles. On the one hand, the "pressure waves" lead to a corrosion-like stressing of the surface of particles, which is associated with the release of surface materials. This is for example exploited by the cleaning of equipment in the ultrasonic bath, a technique which is widespread nowadays for the sterilizing of medical equipment. As the fungi, in particular fusarium fungi, aspergillus fungi or penicillium fungi the secondary metabolic products of which indeed represent the mycotoxins, preferably adhere to the outer side of the cereal grains, the ultrasonic treatment now achieves a substantial release of the fungi and spores and their dispersion into the solution and/or leads to the fungi metabolic products or the mycotoxins being brought into solution.

In parallel to this physical process, chemical processes are however "triggered" by the ultrasonic waves or by the microcavitation processes which often differ from the customary reaction routes and which are to be classified in the special field of so-called "sono-chemistry" (see "Ultrasound in Synthesis" S. V. Ley and C. M. Low Edt., Springer Verlag, New York (1989)).

In the case of the trichothecenes, visible chemical reactions are now triggered which lead to a molecular change of the toxins, with a reaction also probably taking place at the 12,13 epoxide and with the toxophoric epoxide ring thus being destroyed. From the chemistry of the epoxides one knows that these are able to react both in the acidic and also in the basic environment, for example with primary or secondary amino components. Alcohol groups or water which are catalyzed, preferably acidicly, via radical reaction mechanisms can however also serve as further reaction partners. The customary reaction conditions for this are always heat and pressure with a relatively long reaction time.

Ester or lacton groups in the molecule, such as exist in the zerealenones, ochratoxins and aflatoxins, are able, under corresponding conditions, to react with for example primary or secondary amines to form corresponding amides, whereby a drastic molecular change proceeds.

Surprisingly one can however also induce such reactions via the ultrasonic bath treatment of solutions. The constituent materials of the cereals which have been introduced in small quantities but rapidly into aqueous solution during the ultrasonic treatment of slurries of seeds and cereal grains and also cereal meal in water now function in turn as reaction partners with, for example, the 12,13 epoxide of the various trichothecene mycotoxins and bring about the chemical change thereof. In this way a chemical detoxification is achieved. The temperature range between 20° and 50° C. has shown itself to be the preferred "Sono chemical" reaction temperature in an aqueous medium, with the addition of protic organic solvents, preferably methanol or ethanol, often acting to accelerate the reaction.

In the physical method the addition of solvent not only serves to accelerate a reaction, but rather also to improve wetting of the seed and cereal samples in order to thereby ensure improved desorption of the toxin containing components from the sample surface and their suspension or solution in the water. The addition of alkali and/or amines or acids to the ultrasonic reaction solution likewise acts as an accelerator and can become necessary when the constituent materials of the cereals which go into solution (which varies from kind to kind) do not have the composition and concentration required to ensure a detoxification reaction. After the ultrasonic treatment of the seeds, cereals and cereal meal has been completed, the material is, in accordance with the method, separated from the aqueous treatment solution, washed again with water (optionally with ultrasonic treatment) and subsequently dried.

The ultrasound thus acts as a specific energy source for the introduction of chemical reactions and simultaneously as a cleaning method for the release of the toxins from the surface of the cereal or seed grains.

Furthermore, investigations have shown that the content of in particular zearalenones, ochratoxins and aflatoxins in cereals can be reduced by a good 70% to 80% by means of the method of the invention.

The described complete process for the detoxification of mycotoxins and in particular of fusarium mycotoxins of the trichothecene type is very gentle and very simple. No or only a few auxiliary reagents which are compatible with foodstuffs are required and the detoxified end products which are obtained are equivalent in appearance, taste and quality to low-toxin seeds, cereals and cereal products.

The following examples explain the invention without restricting it.

BRIEF DESCRIPTION OF THE DRAWINGS

FIG. 1 is a schematic illustration of a plant with several treatment stations arranged behind one another, FIG. 2 is a schematic perspective view of a treatment channel or treatment tube, FIG. 3 is a schematic section through a treatment station.

FIG. 4 is a table which shows the experimental results in the detoxification of maize grain, and FIG. 5 is a table which shows the relationship between the content of toxin in dependence on the duration of the detoxification.

DESCRIPTION OF THE PREFERRED EMBODIMENTS

EXAMPLE 1

Detoxification of maize grains which are contaminated with deoxynivalenol (DON).

1 kg of dried maize grains (degree of drying ca. 10% residual moisture) with an average DON contamination of 400 ppb (400 μg/kg) is subjected to ultrasonic radiation in an ultrasonic bath with a quantity of water of 2 liters to which 100 ml of ethanol have been added with continuous turning over of the grains for a time period of 90 min., with a pulse sequence of 10 min. sonic duration, 10 min. pause, 10 min. sonic duration etc. being observed. The bath temperature rose from initially 20° C. to 40° and then to 50° C. and amounted on an average to approximately 40° C. At the end of the ultrasonic treatment the maize grains were sieved off from the treatment solution, were washed again with $H_2O$ and dried. The detoxified dried maize grains were analyzed in the same way as the starting material with respect to the DON content. The content of DON amount to 30 ppb which corresponds to a degree of detoxification of ca. 92%.

This test arrangement was repeated five times with similarly contaminated maize and it was shown that the degree of detoxification lay in all cases over 90%.

A bath of the Elma company with an ultrasonic oscillator of frequency 35 kHz and with a 600 W generator was used as the ultrasonic bath in all the test series (examples 1 to 7).

The DON analysis of the maize samples was carried out in our laboratory following the methods of R. Kostianinen et al. (Arch. Enviro. Contom. Toxicol. 18, 356–364 (1989)) in following the methods by R. Black et al. (J. Chromatogr.338, 365–378 (1987)) and with the aid of GC-ECD analyis, with the methods having a determination limit of ca. 5 ppb. The result was verified by means of GC-MS.

EXAMPLE 2

Detoxification of maize grains which were contaminated with deoxynivalenol (DON), T-2 toxin (T-2), HT-2 toxin (HT-2), diacetoxyscirpenol (DAS), 3-acetyldeoxynivalenol (3-AcDON) and triol.

Prior to the ultrasonic treatment, four samples each of 150 g of dried maize grains (basic contamination 300 ppb DON, 230 ppb 3-AcDON, the other trichothecene toxins<5 ppb) were respectively doped to 500 ppb with each of the named toxins. The four maize grain samples were each formed into a slurry with 300 ml of water, which contained 20 ml of methanol, in a respective glass cylinder which was suspended in an ultrasonic bath and were subjected to time-pulsed ultrasonic radiation (10 min. intervals) for over 90 min. The bath temperature amounted to 35° C. on average. After 90 min. the ultrasonic treatment (decontamination and detoxification) was stopped.

After separation of the grains from the reaction solution without any washing procedure, a quantitative trichothecene analysis for the named toxins was then carried out on the samples both for the grains and also for the treatment solution. The results are summarized in Table 1.

Table 1

From the results it can be seen that the detoxification process for trichothecene toxins on cereals can be achieved with a simple ultrasonic treatment. The doping of the solution with the various trichothecene toxins was consciously selected to be extremely high in order to make the overall degree of efficiency clear. The fact that the analysis of the maize shows residual contents of toxis has two causes.

a) The dried maize (ca. 10% moisture) takes up water during the ultrasonic treatment and reaches a moisture content of ca. 25% after separation of a solution. Via this swelling process small quantities of the very high toxin quantities which were present in the solution probably enter into the interior of the grain and thus escape the detoxification, since the ultrasonic waves hardly penetrate into the interior of the grain in order to initiate a sono-chemical reaction there.

b) In the test under discussion no washing process was carried out for the maize grains after separation from the toxin solution and thus a residual content of toxins of the maize grain remained. A washing process proves to be sensible from this finding. The "detoxification power" of the alcoholic maize slurry could also be slowly exhausted in order to quantitatively decontaminate a total toxin content above 3000 ppb. The degree of detoxification of the various toxins on the maize and in the solution amounted between 75% and 95%.

EXAMPLE 3

Decontamination and detoxification of maize grains which were contaminated with deoxynivalenol (DON) as a function of the ultrasonic treatment duration.

1 kg of dried maize grains which had an initial average contamination of 600 ppb DON were formed into a slurry with 2 liters of tap water which contained 50 ml of ethanol and were ultrasonically treated in time pulses with light stirring (10 min. ultrasonic treatment, 10 min. pause, 10 min. ultrasonic treatment etc.). Maize and ultrasonic solution samples taken after 5, 10, 30, 50, 70, 90, 110, 130 and 150 min. were analyzed separately and the values summarized in Table 2.

Table 2

From the results it can be seen that the decontamination process of trichothecene toxins, in the present case DON, on cereals (maize) takes place in parallel with the detoxification process but not however with the same speed. The decontamination process with ultrasonic treatment of the cereal products (maize) takes place initially faster. The reduction of the toxin content (DON content) appears, as mostly found, to be relative to the initial content which was present prior to the ultrasonic treatment, wherein one already achives a detoxification of the cereal grain (maize) of ca. 90% after 70 min. After 10 min. of ultrasonic treatment one already obtains with this test arrangement a reduction of the toxin content (DON) of 50%.

The degree of detoxification achieved by ultrasonic treatment can certainly be optimized with an improvement of the ultrasonic treatment process or of its technological optimization (high microcavitation density in the vicinity of the cereal grain and extensive avoidance of premature damping of the ultrasonic waves). Dry cereals will possibly also exhibit a different (slower) kinetic detoxification process as for example cereal which is damp from harvest. The relative reduction of the content of deoxynivalenol (DON), which must be regarded so to say as the lead-substance for a contamination of cereals (maize) with trichothecene mycotoxins, appears to be a good measure for the degree of the overall detoxification of trichothecene mycotoxins via the ultrasonic treatment.

The washed and dried maize grains were problem-free with respect to their appearance, taste and quality.

EXAMPLE 4

Detoxification of wheat grains, which were contaminated with deoxynivalenol (DON) and 3-acetyldeoxynivalenol (3-AcDON).

300 g of whole wheat grains which have an average contamination of 200 ppb DON and 110 ppb 3-AcDON were formed into a slurry with 400 ml of water to which 10 g $Ca(OH)_2$ and 1 ml of methylamine were added and were ultrasonically treated in a bath for 70 min. in time-pulsed matter (10 min.). The mean ultrasonic bath temperature amounted to ca. 30° C. The content of DON and 3-AcDON in the separated off and washed wheat grains fell by ca. 95% from the initial values.

EXAMPLE 5

Detoxification of oats, which was contaminated with deoxynivalenol (DON).

150 g of dried whole oat grains with a base contamination of DON of 60 ppb were formed into a slurry in 200 ml of mains water to which 30 ml of ethanol and 0.3 ml of concentrated aqueous ammonia solution had been added and were subjected to an ultrasonic treatment for a duration of 70 min. in a timewise unpulsed manner. The mean ultrasonic bath temperature amounted to ca. 35° C. The DON content in the oat grains washed with water sank by over 90%.

EXAMPLE 6

Detoxification of maize meal which has an average deoxynivalenol (DON) contamination of 550 ppb with the addition of acetic acid.

200 mg of dry maize meal with 500 ml of tap water had 20 ml of ethanol and 2 ml of acetic acid added to it for slurrying. After time-pulsed ultrasonic treatment for a duration of 50 min. and after separation of the maize meal and subsequent washing of the meal with water followed by drying at 50° C., one obtained a cereal product which was hardly different from the untreated with regard to appearance, taste and quality. The DON content sank however under 10% by the detoxification treatment with ultrasound.

EXAMPLE 7

Detoxification of maize which was contaminated with deoxynivalenol (DON), zearalenone and ochratoxin.

150 g of dried whole maize grains which originated from a late harvested and hail damaged crop and which had a basis contamination of DON of 800 ppb and of zearalenone (see the structure formula below) of 400 ppb were slurried in 300 ml of mains water which contained 5% ethanol and doped with 100 ppb orchratoxin A (see structure formula below). The suspension was ultrasonically treated for 210 min. while lightly stirred, with the ultrasonic generator being switched in a time-pulsed manner 15 min. active—15 min. inactive—15 min. active etc. In the course of the duration of treatment, the treatment solution warmed to 40° C. At the end of the treatment the material was separated from the solution and washed once with water. The mycotoxin content of both the treatment solution and the treated material were investigated.

| Result: | DON ppb | zearalenone ppb | orchratoxin ppb |
| --- | --- | --- | --- |
| Maize | 120 | 30 | <5 |
| Treatment Solution | 70 | 45 | 8 |

The mycotoxin content sank in all values by between 85% and 95% both in the maize grains and in the treatment solution

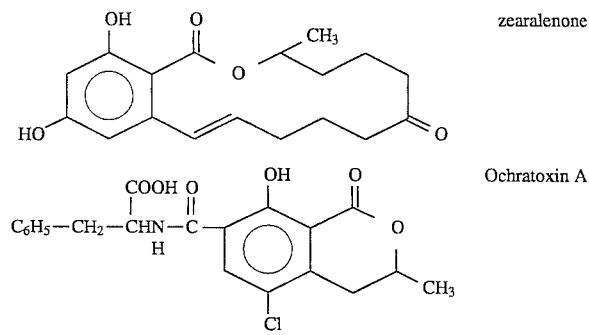

EXAMPLE 8

Detoxification of peanut meal which was doped with aflatoxin $B_1$.

100 g of ground up peanut kernels were slurried in 300 ml of mains water which contained 5% ethanol and to which 10 ml of 30% aqueous ammonia solution were added. This slurry of the treatment material in the treatment solution was doped with 600 ppb aflatoxin $B_1$ and subsequently subjected to the ultrasonic treatment. Treatment was effected for 210 min. with pulsed operation of the ultrasonic generators in a 15 min. cycle and while lightly stirring. After separation of the treated material from the treatment solution and subsequent washing with water the treated material was dried at 60° C. The analysis of the material and of the treatment solution gave the following result:

|  | Aflatoxin $B_1$ |
| --- | --- |
| Peanut meal | 1 ppb |
| Treatment solution | 17 ppb |

Accordingly, the toxin content reduced by over 90%

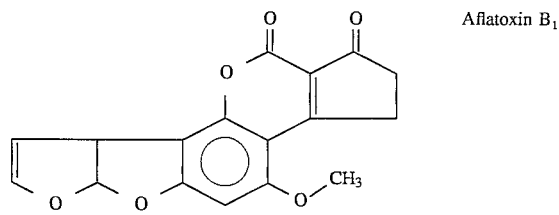

EXAMPLE 9

Cell-toxilogical examination of the detoxification of DON in aqueous solutions.

An original aqueous solution of DON (1000 ppb) was divided into 7 aliquot parts with 5 aliquotes being mixed with either ammonia, sodium bicarbonate, sodium carbonate, hydrogenic acid and proponic acid. The pH values of the solution lay between pH3 and pH10. These solutions, as well as an aqueous control sample, were subjected to an ultrasonic treatment which was not pulsed with respect to time for a duration of 20 min. After completion of the treatment the solutions were buffered up to approximately pH7 and supplied to a cell-tox test. The results yielded that a detoxification of DON occurred via the ultrasonic treatment with the supplied chemicals (acids or bases); an ultrasonic treatment without the addition of chemicals led to no detoxification. A quantitative analysis of such types of test is difficult.

EXAMPLE 10

Cell-toxilogical examination of the detoxification of DON in maize extracts as obtained with the ultrasonic treatment.

An aqueous alcoholic "extract" was produced from 500 g of finely milled maize grains which had an average DON contamination of 800 ppb, wherein any ultrasonic treatment was avoided. Standing time 50 min.; careful reduction of the extract by a half in order to remove all the alcohol.

In parallel with this, a detoxification in accordance with example 1 was carried out with the same maize. According to the DON analysis of the dried end material the degree of detoxification amounted to 90%.

An extract was now produced as above from the milled detoxified maize and divided into two. One part remained with a DON content of 80 ppb whereas in contrast the second part was doped up once more to 800 ppb with an original aqueous DON solution.

A cell-tox test was carried out with all these extracts. It showed unambiguously that the reduction of the DON content by 90% also meant its detoxification. The supposition that perhaps chemical reactions may be triggered during the ultrasonic treatment of cereal grains under the given conditions which attack the toxophoric 12,13 epoxide ring are thus herewith confirmed.

The examples 9 and 10 already show that the invention is not only applicable to the decontamination and detoxification of cereals but can also be applied to the treatment of contaminated discharged water (example 9) or of feedstuff dispertions in the form of maize extracts (example 10).

Furthermore there are indications that the detoxification process by means of ultrasonic treatment proposed here represents a general method of treatment for mycotoxins with reactive or unstable functional groups having wide-reaching application possibilities.

Moreover, it appears from the current state of the investigations that the process can be straightforwardly carried out on an industrial scale. For this two possibilities appear to be promising. On the one hand, one can add the material to be treated to the desired liquid into the large container and radiate the ultrasonic energy into this container in order to induce microcavitation there. For this it is desirable to stir the liquid around with cereal so that the cereal is present in suspension in the liquid so that the ultrasonic generators are not damped by the cereal material and also to ensure that the desired microcavitation occurs to the desired extent, for example through the entire or through a substantial part of the treated volume.

Secondly, there exists the possibility of letting the liquid with the material contained therein flow through a treatment channel and to treat it with ultrasonic energy therein. This treatment can use a single ultrasonic generator or a plurality of ultrasonic generators or ultrasonic guns (tips) can be arranged along and/or transverse to the channel. In order to achieve an adequate duration of treatment in the channel without the channel becoming too long it is expedient to let the liquid with the material contained therein flow several times through the channel. The ultrasonic frequency, the amount of energy radiated in and the exact design of the channel should, also here, be so performed that the desired microcavitation occurs.

The length of the channel and the number and density of the ultrasonic generators arranged thereon thus also determine the duration of treatment of the material via the throughflow time, with the total channel being describable in terms of channel segments arranged on top of one another or behind one another; this can similarly be achieved by a multiple passage of the material through one channel.

With respect to the ultrasonic frequency, it can be generally stated that this is not critical, it must only lie in the ultrasonic range. This range extends from ca. 10 Hz to 10 MHz with the range up to 100 kHz being termed as the power ultrasonic range and the further range up to 10 MHz principally 1–10 MHz being characterized as the high frequency ultrasonic range.

The amount of energy radiated in also appears not to be critical, it is only of importance that the desired microcavitation occurs. The ultrasonic frequency and the amount of radiated-in energy used may optionally be matched to the actual design of the treatment container or canal and to other parameters. This can be performed experimentally. In general it is true that the lower the frequency the lower the power required in order to produce the cavitation effect at low frequencies so that, for this reason, lower frequencies are to be preferred. The power from the ultrasonic generators which is taken up has an influence on the volume of the liquid in which the cavitation can be produced.

An apparatus for carrying out the method in accordance with the invention is described in the following. In this, components corresponding to one another in the various figures of the drawing are provided with the same reference numerals.

FIG. 1 shows a plant for the decontamination and detoxification of material to be treated, in particular of cereals, comprising a pre-treatment station, for instance a pre-swelling container 12, a row of treatment stations 14 arranged one after another and a post treatment station, for instance with a drying tower 16. A collection container 17 is arranged below each of the treatment stations 14. Conveyor ducts 22 are provided between the pre-swelling container 12 and the first treatment station 14, between the individual treatment stations 14, as well as between the last treatment station 14 and the drying tower 16, each conveyor duct 22 connecting an inlet 18 of a treatment station 14 to an outlet 20 of the preceding treatment station or to the pre-swelling container 12. The conveyor duct 22 associated with the outlet 20 of the last treatment station 14 leads to the drying tower 16.

In order to transport the material to be treated through the conveyor ducts 22, these can be assigned a screw 24 or a pump 26 as indicated in FIG. 1.

Figure 2:
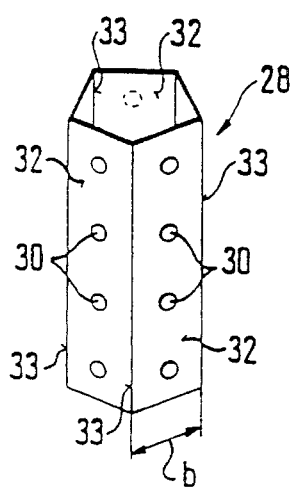
Figure 3:
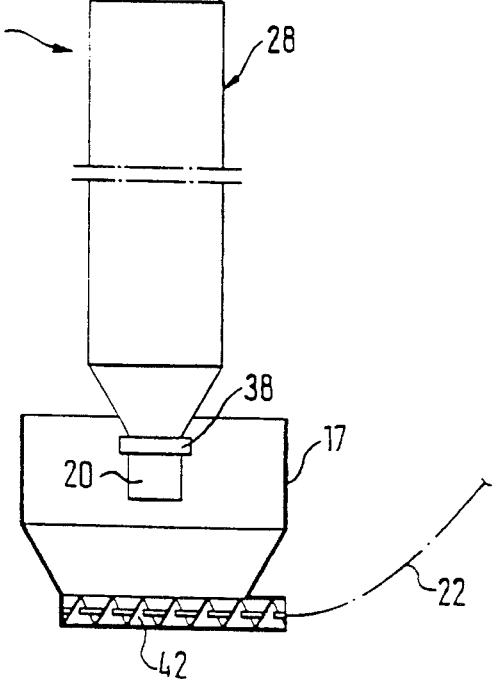
Figure 5:
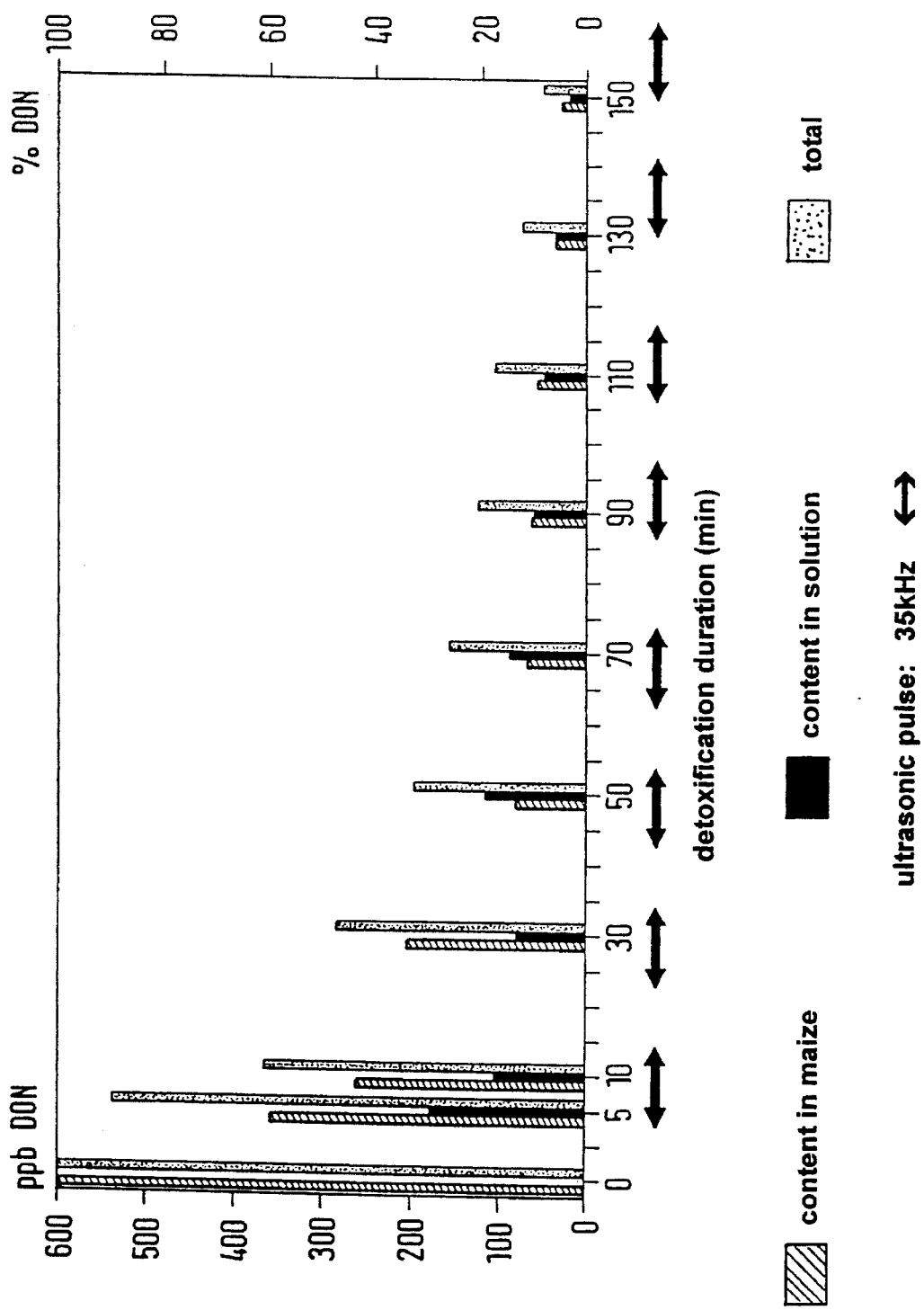

As shown for instance in FIG. 3, each treatment station has a vertically arranged channel 28, the cross-section of which forms a polygon. The cross-section of the treatment channel 28 is preferably an equilateral pentagon as shown in FIG. 2.

Ultrasonic generators 30 are so distributed over the length of the side surfaces 32, which have a width which amounts to preferably between 7 cm and 20 cm, in particular 10 cm to 15 cm, covering the area of the side surfaces that the ultrasonic waves emitted from them are incident on the respectively oppositely disposed edge 33 of the treatment channel 28.

The cross-section of the treatment channel 28 can however also be four-sided or six-sided. However, the ultrasonic generators 30 are then to be helically arranged so that they do not lie directly opposite one another. Interference of the ultrasound waves are thus substantially avoided. If the separation of the ultrasound generators is large enough, for instance more than 20 to 25 cm, then similarly practically no more interference occurs.

Corresponding to FIG. 3, a treatment station 14 at the inlet 18 has an inlet container 36 with an inlet opening 34. The inlet container 36 is connected to the upper end of the treatment channel 28 via a throughflow regulator 37. The outlet 20 is positioned at the lower end of the treatment channel 28 optionally via a corresponding throughflow regulator 38. The collection container 17 is provided below the outlet 20, and an inlet section 42 of the conveyor duct 22, which is only indicated in dotted lines, is mounted on the underside of the collection container 17 in order to transport material such as cereal which has been treated or which is to be further treated to the subsequent treatment station 18 or to the drying tower 16.

An outlet section 53 of a conveyor duct 22 is arranged above the inlet opening 34 for supplying the material or cereal or similar to be treated.

The manner of working of the plant shown in FIG. 1 is explained with the aid of the treatment of cereals.

The cereal is pre-swelled in the pre-swelling container in a treatment liquid such as water with ethanol. The swelling time for this amounts to between 20 and 200 min. The cereal is subsequently transported via the conveyor duct 22 to the first handling station 14 and filled through the inlet 18.

The throughflow of the cereal grains through the treatment channel 28 filled with a treatment fluid, that is to say the quantity of the cereal grains passing through the treatment channel 28 per quantity of liquid in the treatment channel 28, is so controlled by means of throughflow regulators 37, 38 that the cereal grains are accessible from all sides by the ultrasound waves or for the microcavitation.

After passing through the treatment channel 28, the cereal grains pass into the collection container 17 through the outlet 20, the grains being transported out of the collection container 17 by means of the conveyor duct 22, which has a screw to the subsequent treatment station 14, where the grains pass through the treatment channel 28 in substantially the same manner. The grains are then conveyed out of the last treatment station 14 to a drying tower 16.

The placement of a plurality of treatment channels 28 behind one another, as occurs in the plant of FIG. 1, makes it possible to provide different treatment liquids in the individual treatment channels 28. Pure water may also be chosen as the treatment liquid for this which is especially expedient for the last treatment station 14 before the drying tower 16. In order to achieve a problem-free decontamination and detoxification even for a continuous operation of the plant, the corresponding treatment liquid can be continuously renewed in each treatment station 14. This can, for instance, take place by filling up from below with fresh treatment liquid. The treatment liquid can then be removed at the inlet 18 via a suitable overflow.

The number of passes of the cereal grains through a plurality of treatment channels 28 lies between 2 and 20, preferably between 2 and 8, the length of the treatment channels 28 amounting preferably to 1 m to 2 m, in particular to 1.5 m, but can also be longer or shorter. It thus results that the effective time in the treatment channel 28 per cereal grain can lie for instance between 10 and 100 sec. Thus the treated cereal grains are only subject to a relatively short treatment loading.

After separating off the cereal grains from the respective treatment solution, these may optionally be further treated by ultrasound in order to achieve a detoxification of remaining amounts of mycotoxins in the treatment solution which is as complete as possible.

For the ultrasonic treatment either all or selected ones of the ultrasonic generators 30 can be so activated that they radiate ultrasonic waves with the same or with different amplitudes or energies, pulsed or unpulsed.

Experiments were carried out with a single treatment station 14, charges of e.g. 60 kg of maize in 300 liters of treatment fluid of 1% ethanol in water were performed. After five passes, a detoxification or decontamination of the maize of 82% was achieved. The maize was pre-swelled for two hours in pure water prior to the actual detoxification-decontamination treatment.

In a further experiment in which water was used as the treatment liquid and in which the maize was pre-swelled for 2 hours with 1% ethanol in water a detoxification or decontamination of approximately 80% was achieved.

The swelling of the maize serves principally for the moisturizing and wetting of the grain material. Accordingly, freshly harvested cereal does thus not need to be pre-swelled.

If "pure tap water" is used as the treatment liquid it is to be taken into account that, as a result of the slurrying of the cereal in the water, a certain but small part of the cereal content is dissolved in the water, such as for example starch, sugar etc. These very small quantities of dissolved cereal contents then react with the mycotoxins under the influence of the ultrasound and microcavitation and thus effect the treatment effect. The small particles in suspension in the slurried water, for instance starch particles, can also participate in the total reaction. Finally, the water, which is cloudy as a result of the particles in suspension, is separated from the cereal grains which are consequently washed once again with water so that the cereal is finally very clean.

Since cereal is always dusty as a result of the harvesting process, the dust is similarly also slurried in the treatment liquid, i.e. in water or water plus additive, and thereby represents an in situ produced aqueous treatment medium. It is not only a surface cleaning which takes place during the slurrying of cereal grains in the treatment liquid which is actuated without ultrasound, rather, parallel to this, an in situ treatment or chemical reaction in the aqueous medium is achieved, whereby the decontamination effect and the detoxification effect is obtained.

What is claimed is:

1. Method for the decontamination and detoxification of a material contaminated with at least one mycotoxin, said material being selected from the group consisting of foodstuffs, feedstuffs, mycotoxin contaminated aqueous suspensions, and mycotoxin contaminated aqueous solutions, said at least one mycotoxin being a fusarium mycotoxin of the trichothecene series of the general formula with the radicals $R_i$ to $R_5$ being trichothecene mycotoxins including T-2 toxin (T-2), HT-2 toxin (HT-2), diacetoxyscirpenol (DAS), monoacetoxyscirpenol, neosolaniol, nivalenol (NIV), deoxynivalenol (DON), 3-acetyldeoxynivalenol (3-AcDON), T-2 tetraol, scirpentriol, fusarenon, crotocin, and satratoxin H, the method comprising the step of subjecting the material in an aqueous liquid to ultrasonic energy of a frequency and for a period of tame sufficient to induce microcavitation in the aqueous liquid and sono-chemically induced reactions of said at least one mycotoxin.

2. Method in accordance with claim 1, wherein the material comprises at least one of rice, buckwheat, legumes, nuts, maize, wheat, barley, oats, rye and meal and farina thereof.

3. Method in accordance with claim 1, wherein said aqueous liquid is one of pure tap water and a mixture of tap water with at least one chemical which has a hydroxyl group.

4. Method in accordance with claim 3 wherein the chemical is at least one of methanol, ethanol, propanol, glycerine and polyethyleneglycol.

5. Method in accordance with claim 1, including the step of adding at least one of an alkali and a compound with an amine function to the aqueous liquid.

6. Method in accordance with claim 1, including the step of adding at least one acid to the aqueous liquid.

7. Method in accordance with claim 1, wherein the subjecting step is carried out in a non-pulsed manner over a time duration of 10 seconds to 200 minutes.

8. Method in accordance with claim 1, wherein the subjecting step is carried out at a temperature of the aqueous liquid between 12° and 50° C.

9. Method in accordance with claim 1, including the steps of separating detoxified material in the aqueous liquid from the aqueous liquid and subsequently washing the detoxified material with water.

10. Method in accordance with claim 1, wherein said material comprises seeds and cereals, and including the step of pre-swelling said material in a treatment liquid.

11. Method in accordance with claim 1, wherein the subjecting step is carried out in a large container with at least one ultrasonic oscillator which radiates ultrasonic energy into the container, and including the steps of selecting an ultrasonic frequency of said ultrasonic oscillator, a quantity of energy radiated by said ultrasonic oscillator, an energy density in said aqueous liquid and said container so that said microcavitation is achieved in said aqueous liquid in the container, and keeping the aqueous liquid and the material therein in motion.

12. Method in accordance with claim 1, comprising the step of flowing the aqueous liquid together with the material to be treated therein along a treatment channel, positioning at least one ultrasonic generator along the channel and flowing the aqueous liquid including the material therein past the generator, and selecting an ultrasonic frequency of said ultrasonic oscillator, a quantity of energy radiated by said oscillator, an energy density in said aqueous medium and said channel so that microcavitation is achieved in the aqueous liquid.

13. A method in accordance with claim 4 wherein said chemical comprises one of methanol or ethanol which is present in a concentration between 1% and 10%.

14. A method in accordance with claim 5 wherein said alkali comprises one of calcium hydroxide, sodium hydroxide, sodium dicarbonate and sodium carbonate.

15. A method in accordance with claim 5 wherein said amine comprises one of ammonia and methylamine.

16. A method in accordance with claim 6 wherein said acid comprises a mineral acid.

17. A method in accordance with claim 16 wherein said mineral acid comprises one of hydrochloric acid, sulphuric acid and phosphoric acid.

18. A method in accordance with claim 6 wherein said acid comprises an organic acid.

19. A method in accordance with claim 18 wherein said organic acid comprises one of acetic acid and propionic acid.

20. A method in accordance with claim 1 wherein the subjecting step is carried out in a time pulsed manner over a time duration of 10 sec. to 200 min.

21. A method in accordance with claim 9 wherein said subsequent washing of said detoxified material is effected with an ultrasonic treatment.

22. A method in accordance with claim 10 wherein said pre-swelling is effected in a mixture of water and ethanol including 99% to 80% water and 1% to 20% ethanol.

23. A method in accordance with claim 10 wherein said pre-swelling is effected over a time in the range from 20 min. to 200 min.

24. A method in accordance with claim 12 wherein said aqueous liquid together with the material to be treated therein is flowed a plurality of times through said treatment channel.

25. A method in accordance with claim 12 wherein said aqueous liquid together with the material to be treated therein is flowed through a plurality of treatment channels arranged in series.

26. Method for the decontamination or detoxification of a material contaminated with at least one mycotoxin, wherein said material is selected from the group consisting of foodstuffs, feedstuffs, aqueous solutions contaminated with said mycotoxin and aqueous suspensions contaminated with said mycotoxin, the method comprising the step of subjecting said mycotoxin contaminated material while in a liquid to ultrasonic energy of a frequency and for a period of time sufficient to induce microcavitation in the liquid medium and sono-chemically induced reactions of the mycotoxins.

27. Method in accordance with claim 26, for the detoxification and decontamination of a material selected from the group consisting of seeds and cereals, and including the step of pre-swelling the material in a treatment liquid.

28. Method in accordance with claim 27, wherein the subjecting step is carried out in a large container with at least one ultrasonic oscillator which radiates ultrasonic energy into the container, and including the steps of selecting an ultrasonic frequency of said ultrasonic oscillator, a quantity of energy radiated by said ultrasonic oscillator, an energy density in said liquid and said container so that microcavitation is achieved in liquid in the container, and keeping said liquid medium and the material therein in motion.

29. Method in accordance with claim 26, comprising the step of flowing said liquid together with the material to be treated therein along a treatment channel, positioning at least one ultrasonic generator along the channel and flowing the liquid including the material therein past the generator, and selecting an ultrasonic frequency of said ultrasonic generator, a quantity of energy radiated by said ultrasonic generator and an energy density and in said liquid said channel so that microcavitation is achieved in the liquid.

30. A method in accordance with claim 27 wherein said pre-swelling takes place in a mixture of water and ethanol comprising 99% to 80% water and from 1% to 20% ethanol.

31. A method in accordance with claim 27 wherein said pre-swelling is effected for a time in the range from 20 min. to 200 min.

32. A method in accordance with claim 27 further comprising the step of stirring said liquid during the ultrasonic treatment.

33. A method in accordance with claim 29 wherein said liquid medium together with the material to be treated therein is flowed a plurality of times along said treatment channel.

34. A method in accordance with claim 29 wherein said liquid medium together with the material to be treated therein is flowed through a plurality of treatment channels arranged in series.

35. A method in accordance with claim 27 wherein said liquid medium together with the material to be treated therein is flowed a plurality of times along said treatment channel.

36. A method in accordance with claim 27 wherein said liquid medium together with the material to be treated therein is flowed through a plurality of treatment channels arranged in series.

37. Method for the decontamination or detoxification of an aqueous liquid contaminated with at least one mycotoxin, the method comprising the step of treating said aqueous liquid with ultrasonic energy of a frequency and for a time period sufficient to induce microcavitation in the liquid and sono-chemically induced reactions of said at least one mycotoxin.

38. Apparatus for the decontamination and detoxification of a material contaminated with at least one mycotoxin, said material being selected from the group consisting of foodstuffs, feedstuffs, aqueous solutions contaminated with the mycotoxin and aqueous suspensions contaminated with the mycotoxin, the apparatus comprising at least one treatment container (28) for receiving said material and a treatment liquid, ultrasonic generators (30) arranged on said treatment container (28), said treatment container being formed as a vertically arranged treatment channel (28) having side surfaces facing the channel through which said material flows and said ultrasonic generators (30) being arranged distributed over a length of the treatment channel (28) on the side surfaces (32) of the treatment channel (28).

39. Apparatus in accordance with claim 38, wherein said treatment channel (28) has a length of 0.4 m to 12.0 m.

40. Apparatus for the decontamination and detoxification of a material contaminated with at least one mycotoxin, said material being selected from the group consisting of foodstuffs, feedstuffs, aqueous solutions contaminated with the mycotoxin and aqueous suspensions contaminated with the mycotoxin, the apparatus comprising at least one treatment container for receiving said material and a treatment liquid, ultrasonic generators arranged on said treatment container, said treatment container being formed as a treatment channel having a cross-section in the form of an equilateral polygon and side surfaces facing the channel through which said material flows, said ultrasonic generators being arranged distributed over a length of the treatment channel on the side surfaces of the treatment channel.

41. Apparatus in accordance with claim 40, wherein said equilateral polygon has sides of equal length, said length lying in the range of 4 cm to 50 cm.

42. Apparatus in accordance with claim 41 wherein said length of said sides lies in the range from 7 cm to 20 cm.

43. Apparatus for the decontamination and detoxification of a material contaminated with at least one mycotoxin, said material being selected from the group consisting of foodstuffs, feedstuffs, .aqueous solutions contaminated with the mycotoxin and aqueous suspensions contaminated with the mycotoxin, the apparatus comprising at least one treatment container for receiving said material and a treatment liquid, ultrasonic generators arranged on said treatment container, said treatment container being formed as a treatment channel having a length of 0.4 m to 12.0 m and side surfaces facing the channel through which said material flows, said ultrasonic generators being arranged distributed over a length of the treatment channel on the side surfaces of the treatment channel.

44. Apparatus in accordance with claim 43, wherein said treatment channel (28) is vertically arranged.

45. Apparatus in accordance with claim 43, wherein said treatment channel (28) has a cross-section in the form of an equilateral polygon.

46. Apparatus in accordance with claim 43 including a plurality of treatment channels (28) arranged in series, each said treatment channel having an inlet and an outlet, a conveyor duct connecting the outlet of each treatment channel to an inlet (18) of a following treatment channel (28), an outlet of a last treatment channel being connected to one of a collection container (17) and a device (16) for further processing said material.

47. Apparatus in accordance with claim 43 wherein said length of said treatment channel lies in the range from 1 m to 5 m.

48. Apparatus in accordance with claim 47 wherein said treatment channel has a length of substantially 1.5 m.

49. Apparatus for the decontamination and detoxification of a material contaminated with at least one mycotoxin, said material being selected from the group consisting of foodstuffs, feedstuffs, aqueous solutions contaminated with the mycotoxin and aqueous suspensions contaminated with the mycotoxin, the apparatus comprising at least one treatment container (28) for receiving said material and a treatment liquid, ultrasonic generators arranged on said treatment container, said treatment container being formed as a plurality of treatment channels arranged in series, each treatment channel having an inlet, an outlet and a side surface, a conveyor duct connecting the outlet of each treatment channel to, an inlet of a following treatment channel, an outlet of a last treatment channel being connected to one of a collection container and a device for further processing said material, the side surfaces facing the channels through which said material flows, at least one of said ultrasonic generators being arranged on the side surfaces of each treatment channel.

50. Apparatus in accordance with claim 49 wherein a last treatment channel in said series is followed by means for drying the material.

51. Apparatus in accordance with claim 50 wherein said drying means comprises a drying tower.

52. Apparatus in accordance with claim 49 including a pre-swelling container 12 arranged as a pre-treatment station and located before a first treatment channel (28) of said series.

53. Apparatus in accordance with claim 49, including one of a conveyor screw (24) and a conveyor pump (26) associated with said conveyor duct (22).

* * * * *